March 6, 1928.

O. J. KUHLKE 1,662,007

CUSHION TIRE

Filed March 17, 1927

INVENTOR.
Otto J. Kuhlke.
BY Ely & Barrow
ATTORNEYS.

Patented Mar. 6, 1928.

1,662,007

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

CUSHION TIRE.

Application filed March 17, 1927. Serial No. 176,043.

This invention relates to cushion tires which are intended for light trucks and similar vehicles, in which the cushioning properties of a solid tire are increased by the presence of cavities or holes in and through the tire body.

It has been old and well known that the cushioning properties of solid tires are increased and cooling of the tires is secured by the presence of holes in or through the tires, but the provision of these holes has frequently led to premature failure of the tires because of the fact that action of the tires tended to become localized.

One of the objects of the present invention is to construct a solid tire of the cushion type in which holes pass through the tire from side to side in a diagonal direction so that at no time in the operation of the tire is the entire load supported either upon pillars or over cavities, but is distributed and divided substantially uniformly over the cavities and over the pillars or piers between the cavities. Diagonally arranged holes for this purpose have been shown in prior patents but, to my knowledge, none has been successful, and it is an object of my invention to construct a successful tire of this type as will be understood from the showing and description herein. This application is a continuation of so much as is common to my prior application Serial No. 100,593, April 8, 1926.

The advantages of the construction will be apparent to those skilled in this art, it being understood that the invention is not necessarily limited to exact conformity with the details shown herein, but may be varied and modified within the scope of the invention as set forth in the claims.

Figure 1:
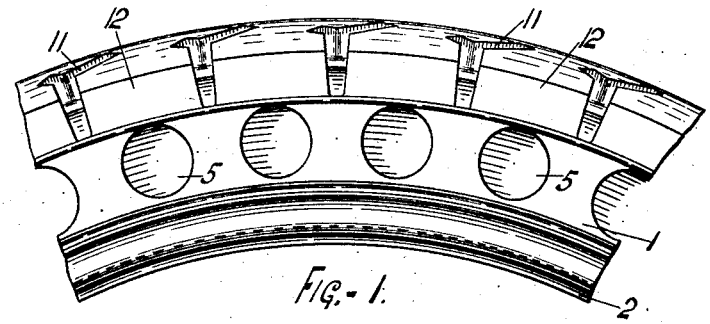
Figure 1 is a side elevation of a cushion tire of the present invention.

In the drawings, the body of the tire is shown at 1, being of any preferred form exteriorly and being usually vulcanized permanently to a metal rim 2, such as is usual in the art, and either demountable or not, as found desirable.

The tire is formed with a plurality of apertures or passageways 5 extending through the tire from side to side, these apertures being placed in diagonal relationship to the circumferential plane of the tire, and preferably at an angle of 45° thereto, as shown, although this angular position may be varied. The advantage of placing the holes at the angular position rather than transversely of the tire lies in the fact that a load supported on the tire will not be sustained by that portion of the tire in which the intermediate pier is located, or by that portion of the tire where the aperture is located, but will be shared by parts of the tire having both conditions, so that as the tire rotates under load, successive periods of solid and apertured tires are avoided. This construction is conducive to easy riding and longer wear of the tires.

Figure 5:
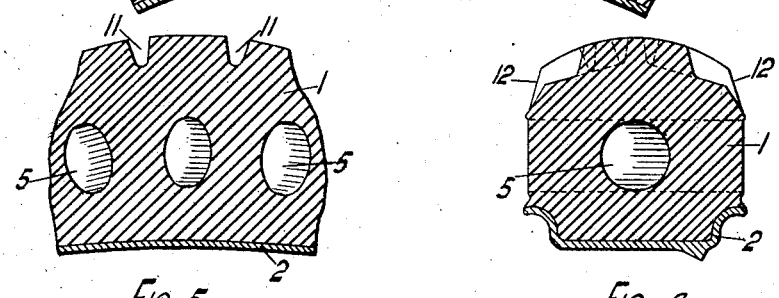
Figure 5 is a section on the line 5—5 of Figure 2.

In solid tires which have heretofore been designed with diagonal recesses or holes through the body of the tire, the holes have been circular in transverse cross-section. Where the holes are circular in transverse cross-section, it will be noted that on a cross-sectional or radial plane of the tire, the holes will be elliptical with the major axis of the ellipse running circumferentially of the tire. This creates a hole in the center of the tire, the upper and lower surfaces of which are in the form of a flattened arch, which is not satisfactory for the support of a solid tire, as the load tends to flatten the arch in any event and this deleterious action is aggravated where the hole is originally in the form of a flattened arch. To obviate this difficulty and disadvantage which was present in the tires of the prior art having diagonal holes, and yet retaining the full benefit of the diagonal holes in the tire, that portion of each cavity which occupies the central portion of the tire, or lies between its extremities, is, when viewed as a cross-section taken at right angles to the axis of the cavity, in the form of an ellipse having its major axis radial to the tire (see Figure 5).

Figure 3:
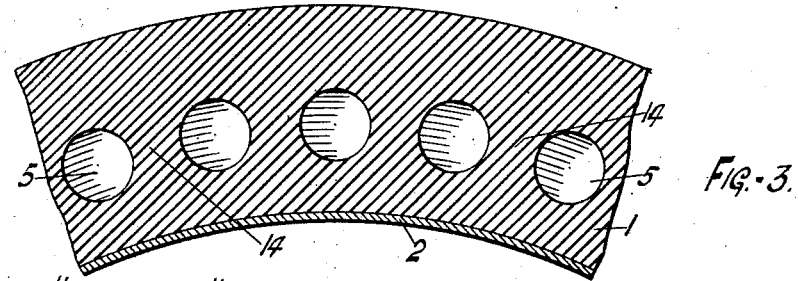
Figure 3 is a section on the line 3—3 of Figure 2.
Figure 4:
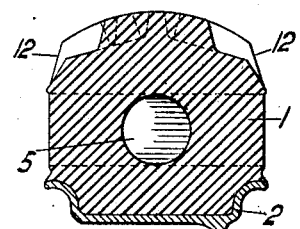
Figure 4 is a section on the line 4—4 of Figure 2.

When this shaped cavity or recess is viewed along the plane of rotation of the tire as in Figure 3, or transversely of the tire in Figure 4, the cavity or recess is circular, or may be substantially circular, depending upon the proportions of the ellipse on which the central portion is formed, and also on the angle at which the recesses is located. As shown in the drawings, the ellipse is of such proportions and so located that the cavity is in circular form, both circumferentially and transversely or radially of the tire. It will be appreciated that the substantial features of the invention may be obtained by so forming and locating the elliptical recess that while a perfect circular form is approximated when viewed as stated, a full circle is not shown.

It will also be noted that where the diagonal hole is extended out to the side of the tire in both sides, the edges of the aperture in the acute angle generated by the pin will be sharp and liable to chipping or breaking and, in addition, no substantial support is provided for the pin. It will also be noted that if the elliptical cross-section is retained to the outer surface of the tire, the hole will appear elliptical. A circular hole at the side of the tire is preferable for the sake of appearance, for which reason the extremities of the holes are not extended outwardly to the sides of the tire, but the holes are formed upon arcs as they approach the side of the tire and are gradually merged into circular form so that the sides of the tire have the appearance shown in Figure 1.

Figure 2:
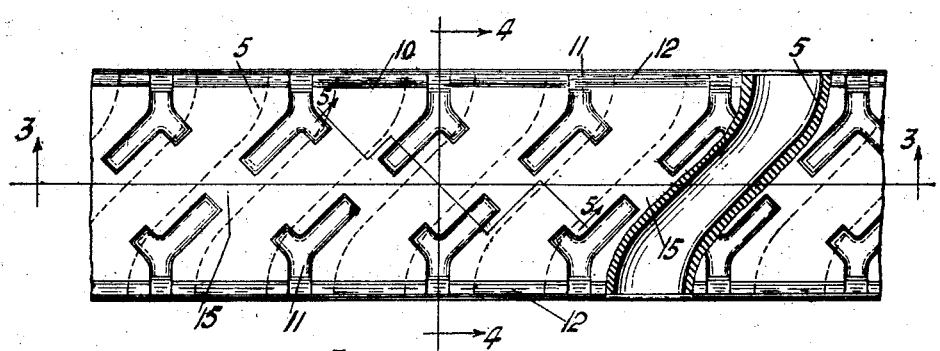
Figure 2 is a plan view.

The tread of the tire is formed with any suitable non-skid tread design, but it is preferable to have the design laid out with reference to the location and direction of the holes. Thus the tread design as shown in Figure 2 is formed of a plurality of diagonally arranged ribs or bars 10 which may be located over the cavities, the spaces 11 between the ribs being located over the piers or solid portions 14 of the tire between the cavities. The ribs may be formed with extensions 12 which merge into the side of the tire and the ribs may be connected by short strips 15 which form a central riding strip and prevent premature tread wear and wiping. By locating the ribs over the holes, any pounding action, due to any unrelieved tread over the piers 14, is relieved.

What is claimed is:

1. A solid tire of the cushion type provided with apertures through the body of the tire below the tread, the said apertures in the interior of the tire being arranged diagonally with respect to the plane of rotation of the tire, the diagonal portions of the apertures being substantially transversely elliptical with the major axis of the ellipse extending radially of the tire, and of such dimensions that an aperture in a radial plane transversely of the tire will be substantially circular, the extremities of the apertures terminating in circular form at the sides of the tires.

2. A solid tire of the cushion type provided with apertures in the body of the tire below the tread, the said apertures extending diagonally of the tire, the diagonal portions of the apertures being substantially transversely elliptical with the major axis of the ellipse extending radially of the tire and of such dimensions that the aperture in a radial plane transversely of the tire will be substantially circular.

OTTO J. KUHLKE.